United States Patent [19]

Kunze et al.

[11] Patent Number: 5,346,156
[45] Date of Patent: Sep. 13, 1994

[54] MAGNETIC-TAPE CASSETTE APPARATUS COMPRISING A DECK FOR MAGNETIC-TAPE CASSETTES REVERSING MECHANISM

[75] Inventors: Norbert Kunze, Ehringshausen; Georg Weber, Lohra Weipoltshausen, both of Fed. Rep. of Germany

[73] Assignee: U.S. Philips Corporation, New York, N.Y.

[21] Appl. No.: 941,465

[22] Filed: Sep. 8, 1992

[30] Foreign Application Priority Data

Sep. 13, 1991 [DE] Fed. Rep. of Germany ....... 4130403

[51] Int. Cl.⁵ ............................................. G11B 15/26
[52] U.S. Cl. .................... 242/340; 360/96.3; 242/356
[58] Field of Search ............... 242/200, 201, 202, 204, 242/206, 208, 209, 210; 360/85, 95.1, 96.1, 96.2, 96.3

[56] References Cited

U.S. PATENT DOCUMENTS

| | | | |
|---|---|---|---|
| 4,260,120 | 4/1981 | Urata et al. | 242/201 |
| 4,681,281 | 7/1987 | Aarts et al. | 242/200 |
| 4,819,891 | 4/1989 | Kamijo | 242/201 |
| 4,871,128 | 10/1989 | Tanaka et al. | 242/201 |
| 4,932,605 | 6/1990 | Klos-Hein et al. | 242/201 |

FOREIGN PATENT DOCUMENTS

| | | |
|---|---|---|
| 0290079 | 11/1988 | European Pat. Off. |
| 3617278 | 11/1987 | Fed. Rep. of Germany |
| 0171751 | 10/1983 | Japan ................... 242/201 |

Primary Examiner—Daniel P. Stodola
Assistant Examiner—John Q. Nguyen
Attorney, Agent, or Firm—Brian J. Wieghaus

[57] ABSTRACT

A magnetic-tape cassette apparatus having a deck for magnetic-tape cassettes with a reel drive mechanism for transporting a tape with a first and an opposite, second tape transport direction. The change-over from the first tape transport direction to the opposite second tape transport direction is affected by a switching mechanism which switches the reel-drive mechanism between a play mode in the forward direction and a play mode in the reverse direction. The switching mechanism includes a switching lever moveable from a first position for the first playing direction to a second position for the opposite second play direction. The switching lever is moved by a pair of switching wheels, whose teeth are engageable with associated teeth of adjacent flywheels for changing over the switching lever from the predetermined position for one playing direction to the predetermined position for the opposite other playing direction by actuating elements provided on the switching wheels.

11 Claims, 12 Drawing Sheets

MAGNETIC-TAPE CASSETTE APPARATUS COMPRISING A DECK FOR MAGNETIC-TAPE CASSETTES REVERSING MECHANISM

CROSS-REFERENCE TO RELATED APPLICATIONS

This application is related to U.S. application Ser. No. 07/941,477 filed concurrently herewith which discloses and claims a deck for magnetic tape apparatus which moves the head mounting plate in a simplified manner and to U.S. application Ser. No. 07/941,592 which discloses a magnetic tape apparatus which changes over to the fast forward mode by means of a simplified mechanical mechanism, also filed concurrently herewith.

BACKGROUND OF THE INVENTION

The invention relates to a magnetic-tape-cassette apparatus comprising a deck for magnetic-tape cassettes and constructed for playing with a first and an opposite second tape transport direction, the change-over from the first tape transport direction to the opposite second tape transport direction being effected by means of a switching mechanism by means of which the reel-drive mechanism can be switched between a play mode in the forward direction and a play mode in the reverse direction, which switching mechanism comprises a switching lever which can be changed over from a first position for the first playing direction to a second position for the opposite second play direction.

A magnetic-tape apparatus having such a reversing mechanism is known from EP 290,079 A2 (PHD 87-085 EP). The switching lever of said mechanism comprises a pivotal arm which is pivotable about the shaft of a central drive wheel and carries a toothed transmission wheel. A two-arm actuating lever acts between the spindle of the transmission wheel and the shaft of the central drive wheel and its free end is acted upon by an actuating device, said lever having a pivot between the contact point on the pivotal arm and its free end. The actuating device comprises a slide which can move the free end of the actuating lever between a first and a second end position to switch the transmission wheel between a first position for the first play mode and a second position for the second play mode in the opposite direction. The use of a slide with its actuating device is complicated.

From DE 36 17 278 C2 it is known to change over from forward operation to reverse operation by means of a switching wheel having a plurality of switching positions along its path of rotation, one of these positions being the reversal position. The switching wheel meshes with a toothed wheel arranged on a capstan and has a toothless segment for each switching position. The switching wheel has cam surfaces followed by levers for forward operation, reverse operation and reversal, which levers are pivotable about the axis of the switching wheel. The effect on the reversal of the deck and on the operation thereof is not apparent.

SUMMARY OF THE INVENTION

It is an object of the invention to provide a magnetic-tape-cassette apparatus of the type defined in the opening paragraph, enabling the tape-transport direction to be changed by means of only rotary or pivotal parts.

According to the invention this object is achieved in that the switching lever can be changed over by means of switching wheels, whose teeth are engageable with teeth of associated drive wheels, for example the flywheels or capstans, for changing over the switching lever from the predetermined position for one playing direction to the predetermined position for the opposite other playing direction by means of actuating elements provided on said switching wheels.

Thus, the change-over is effected by means of toothed wheels provided on the base plate of the deck in a well-defined manner, either by mounting or by moulding-on followed by mobilisation including the provision of a plain-bearing structure in a subsequent process. The construction is technically simple and not vulnerable because sliding actuating members and linkage rods are dispensed with.

In a further embodiment or the invention the switching wheels have toothless segments which in the relevant play mode (forward or reverse) are held within the drive wheels, o- range of the flywheel, teeth, and for changing over the switching lever the switching wheel causing the change-over is allowed to rotate, an actuating spring rotating the relevant switching wheel until the switching-wheel teeth mesh with the flywheel teeth, thereby allowing the flywheel teeth to rotate the relevant switching wheel until an actuating pin provided on said switching wheel has changed over the switching lever from its position in one play mode (forward or reverse) to its position for the other play mode (reverse or forward) via an over-centre point defined by spring force. The transmission path flywheel teeth/switching wheel/switching lever comprises simple and reliable parts.

In a modification of this characteristic feature of the invention the switching wheels comprise stop ridges which cooperate with a stop edge of a starting lever in such a manner that the stop ridges are blocked by the stop edge in the relevant play mode, the toothless segments face the flywheel teeth, and upon its actuation, which is effected by a change-over command, the starting lever liberates the stop ridge of the switching wheel by means of which the change-over process is to be effected, to allow rotation of the relevant switching wheel. The starting lever which initiates the change-over thus enables the switching wheel for carrying out the change-over to perform the change-over process and at the same time it blocks the other switching wheel. After the change-over both switching wheels are blocked again by the starting lever. The ends of the ridges which cooperate with the stop wail of the starting lever are arranged in such a manner that the toothless segments of the switching wheels face the flywheel teeth when the ends engage against the stop wall.

Initially, if no special change-over command is given, the change-over of the switching lever is inhibited in that the reversing lever and the starting lever block one another. However, if the change-over command for the switching lever occurs the pivotal movement of the starting lever is no longer blocked, as a result of which the rotation of the switching wheel performing the change-over is no longer blocked.

For this purpose, in a further embodiment of the invention, the starting lever is locked against initiation of the change-over process by means of a control profile of a reversing lever, in which control profile the starting lever is movable to allow it to be pivoted when the reversing lever has been moved out of a latched position relative to the starting lever by a push-button command or by a control lever which can detect the end of the tape. This interlocking is important in order to achieve that with the spring-biased cooperating levers, i.e. the reversing lever and the starting lever, the reversing process can be initiated rapidly after unlocking.

In a further embodiment of the invention inside the control profile the reversing lever has latching edges behind which a control nose of the starting lever is engageable in the switching end positions to block the starting lever, and the control nose is disengaged from the latching edges when the control lever presses the reversing lever away from the relevant latching edge in such a manner that the control nose enters guide paths, allowing the starting lever, which is biased by the switching-lever spring, to be pivoted so as to liberate the appropriate switching wheel. Thus, the change-over process can be initiated only after unlocking, the switching-lever spring, which urges the switching lever into its instantaneous end position, finishing the change-over of the switching lever after the over-centre point has been passed.

In a further embodiment of the invention the guide paths extend from the latching edges to further latching edges which limit the pivotal movement of the starting lever in that the control nose abuts against them. The control profile thus blocks the starting lever and, when it can pivot, limits its pivotal movement.

BRIEF DESCRIPTION OF THE DRAWINGS

In a further embodiment of the invention the control lever, which is pivotable about a pivot, comprises a sensing arm having a sensing element which follows a radial surface of the reversing wheel, and a switching arm having a projection which, during rotation of the reversing wheel and transport of the magnetic tape, follows an eccentric actuating profile of the primary coupling wheel with a pumping movement and which, when the reversing wheel is stationary because the tape transport has stopped, runs onto a switching profile which actuates the control lever in such a manner that the reversing arm of the control lever moves the reversing lever so as to disengage the control nose. When there is no tape transport the control lever thus ensures that the starting lever is no longer blocked.

The invention will now be described in more detail with reference to the drawings. In the drawings.

DESCRIPTION OF THE PREFERRED EMBODIMENTS

Operating Principle

The reel drive of the deck, which is constructed for forward and reverse operation, is always effected by the capstan motor via an intermediate drive wheel on a single centrally arranged play coupling comprising a primary coupling wheel and a secondary coupling wheel, which rotates constantly clockwise. An intermediate mechanism transfers the torque from the secondary coupling wheel to the forward or the reverse reel disc depending on the play direction. The capstan is driven by the capstan motor via belt on two oppositely rotating flywheels. The flywheels have teeth from which the movements for the reversing operations are derived. This means that the reel drive and the capstan drive are largely independent from one another.

In the fast winding modes the reels are driven via the intermediate mechanism, the play coupling being bypassed by a bypass wheel in order to increase the available winding torque. Them is neither a fast-winding coupling nor a special fast-winding mechanism.

To reduce the fast-winding time the bypass wheel carries two different sets of teeth which with the same axial spacing mesh with different-size teeth of the primary and the secondary coupling wheel, so that in the fast-winding mode the secondary coupling wheel rotates more rapidly than the primary coupling wheel. Since no fast-winding mechanism has been provided this implies that for fast reverse winding a reversal is necessary and after winding the previous playing direction is restored by a new reversal. In general, reverse winding therefore means forward winding in the other direction.

In order to preclude slipping of the belt at the end of the tape despite the absence of a fast-winding coupling the mechanism is dimensioned in such a way that when a limit force is reached the disengaging-type mechanism pivots away from the relevant reel, which pivotal movement is utilised to stop winding.

Reel-Drive Mechanism 09

Drive in the Forward Play Direction (NOR Play Mode)

Figure 1:
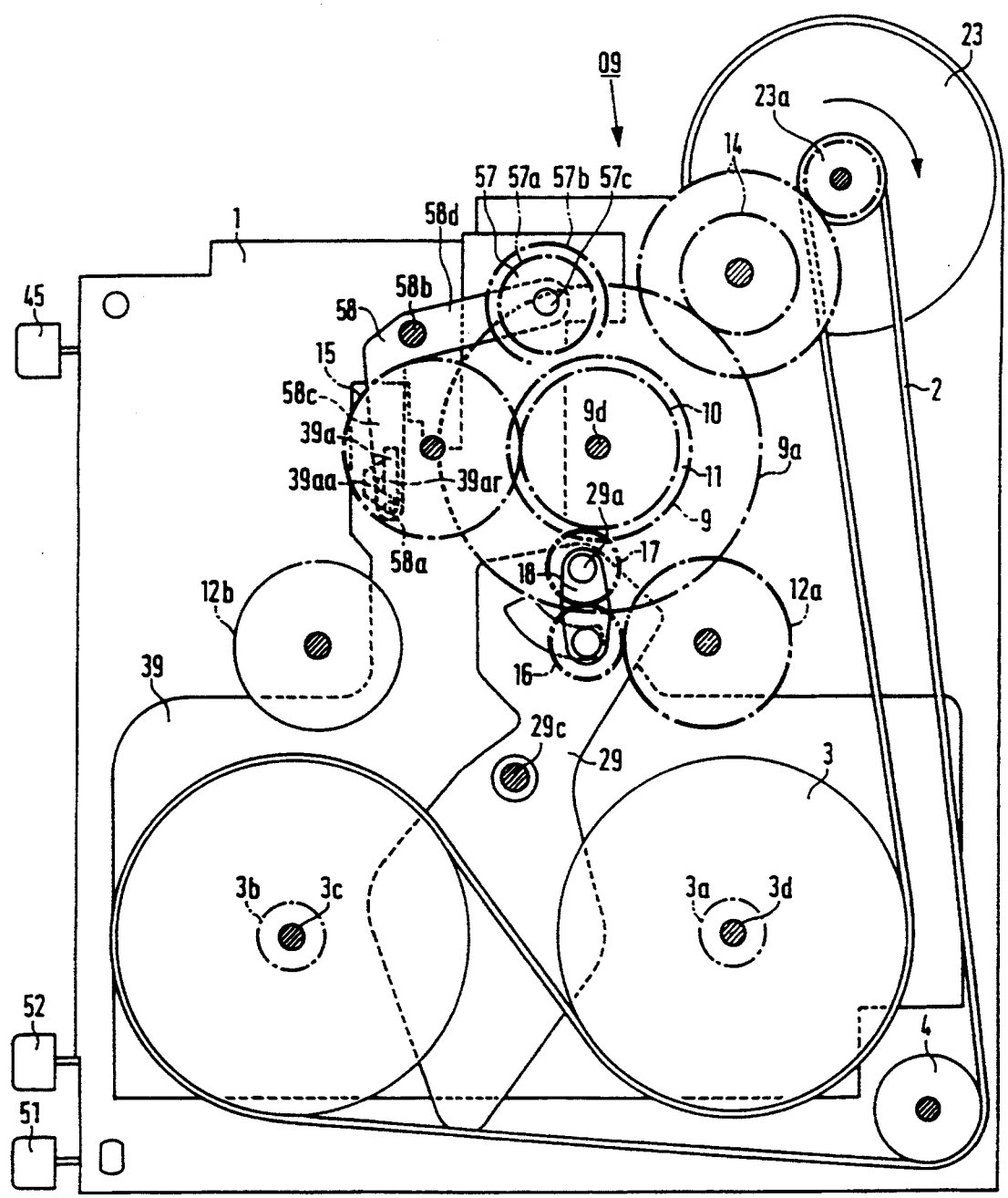
FIG. 1 is a diagrammatic representation of a deck for magnetic-tape cassettes in a magnetic-tape-cassette apparatus set to the forward play direction (NOR)

The diagrammatic representation in FIG. 1 illustrates how the movable parts of the deck on a chassis 1 are driven. By means of a belt 2 a motor 23 drives flywheels 3 for the capstan 3c for reverse play (REV) and the capstan 3d for forward play (NOR) in opposite directions of rotation. The capstans 3c, 3d have teeth 3a and 3b. The belt 2 is passed over a guide roller 4. The flywheels 3a, 3b also serve as drive wheels for driving the switching wheels 31a, 31b.

Figure 2:
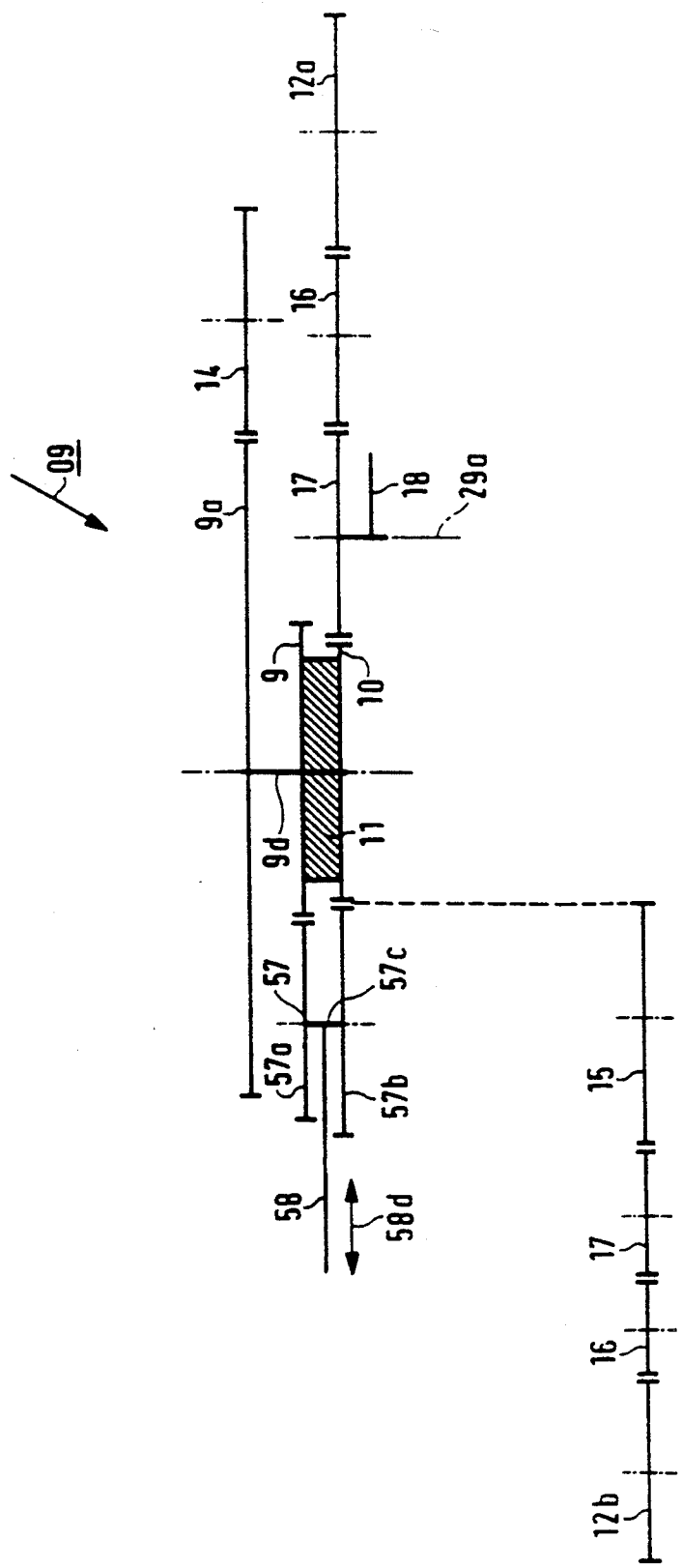
FIG. 2 is a sectional view of the reel-drive mechanism of the deck.

A reel-drive mechanism 09, which is also driven by the motor 23 and is shown in sectional view in FIG. 2, serves to drive the forward reel disc 12a for forward play (NOR) and the reverse reel disc 12b for reverse play (REV). The motor 23 can rotate in only one direction. With its shaft 23a the motor 23 drives the play coupling via an intermediate drive wheel 14, which coupling has a primary coupling wheel 9 with a toothed drive ring 9a, which rotates about a spindle as long as the motor shaft 23a rotates. The primary coupling wheel 9 drives a secondary coupling wheel 10, which is concentric therewith, via a torque-transmitting friction coupling 11.

The secondary coupling wheel 10 is in mesh with an intermediate wheel 17, which is rotatable about a spindle 29a of a switching lever 29. The switching lever 29, which can be set to and held in an end position for forward operation (NOR) and an end position for reverse operation (REV) is then in the NOR position, in which it is urged clockwise. The toothed wheel 17 meshes with a toothed wheel 16, which in the situation illustrated in FIGS. 1 and 2 is in mesh with the NOR reel disc 12a.

Figure 4A:
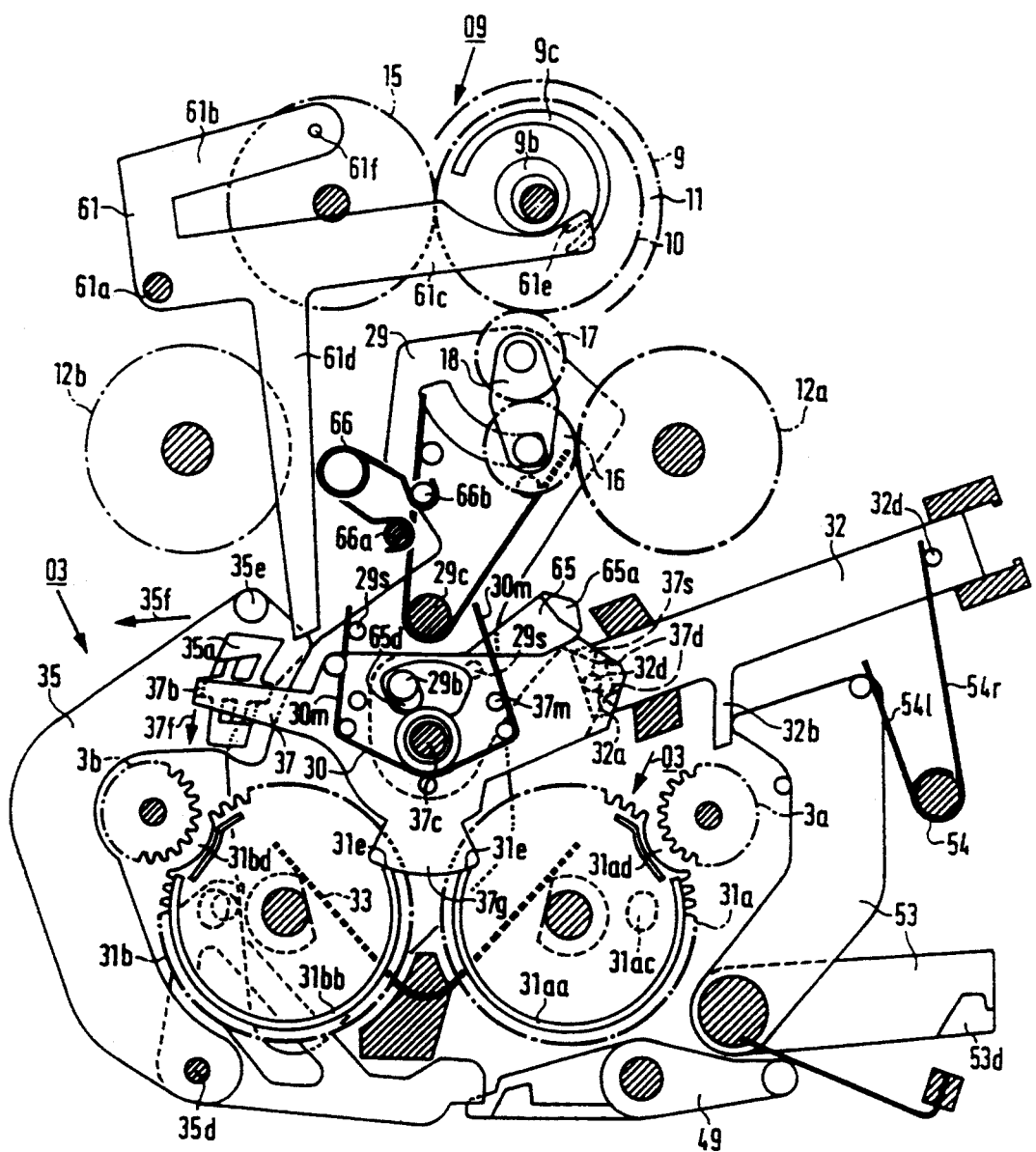
FIGS. 4a, 4b, 4c, and 4d show the switching mechanism and the levers actuating said mechanism in different functional positions.

The meshing forces act on the individual toothed wheels in such a way that the pair NOR reel disc 12a/pivotal wheel 16 is engaging and the pair secondary coupling wheel 10/intermediate wheel 17 is disengaging. In the NOR position shown in FIG. 1 the switching lever 29 is urged clockwise by a switching-lever spring 66 (FIG. 4a). The spring load is such that the switching lever 29 is urged to the right, i.e. clockwise, towards the NOR reel disc 12a.

The reel-drive mechanism 09 comprises a double toothed bypass wheel 57, whose spindle 57c is arranged on a two-arm bypass-wheel lever 58, which is pivotable about a pivot 58b. As is indicated by a double arrow 58d in FIG. 2 the bypass wheel 57 can be engaged with or disengaged from the primary coupling wheel 9 and the secondary coupling wheel 10 in such a way that the coupling 11 is bypassed in the case of engagement and the coupling is operative in the case of disengagement. By means of this bypass wheel 57 the NOR and REV reel discs 12a, 12b can be switched to rapid rotation for the purpose of fast winding. In order to obtain the higher fast-winding speed the transmission ratio has been selected in a such a way that the number of teeth of the primary coupling wheel 9 is larger than the number of teeth of the secondary coupling wheel 10, and that the number of teeth of the bypass wheel 57a meshing with the toothed wheel 9 is smaller than the number of teeth of the bypass wheel 57b meshing with the secondary coupling wheel 10.

Figure 3:
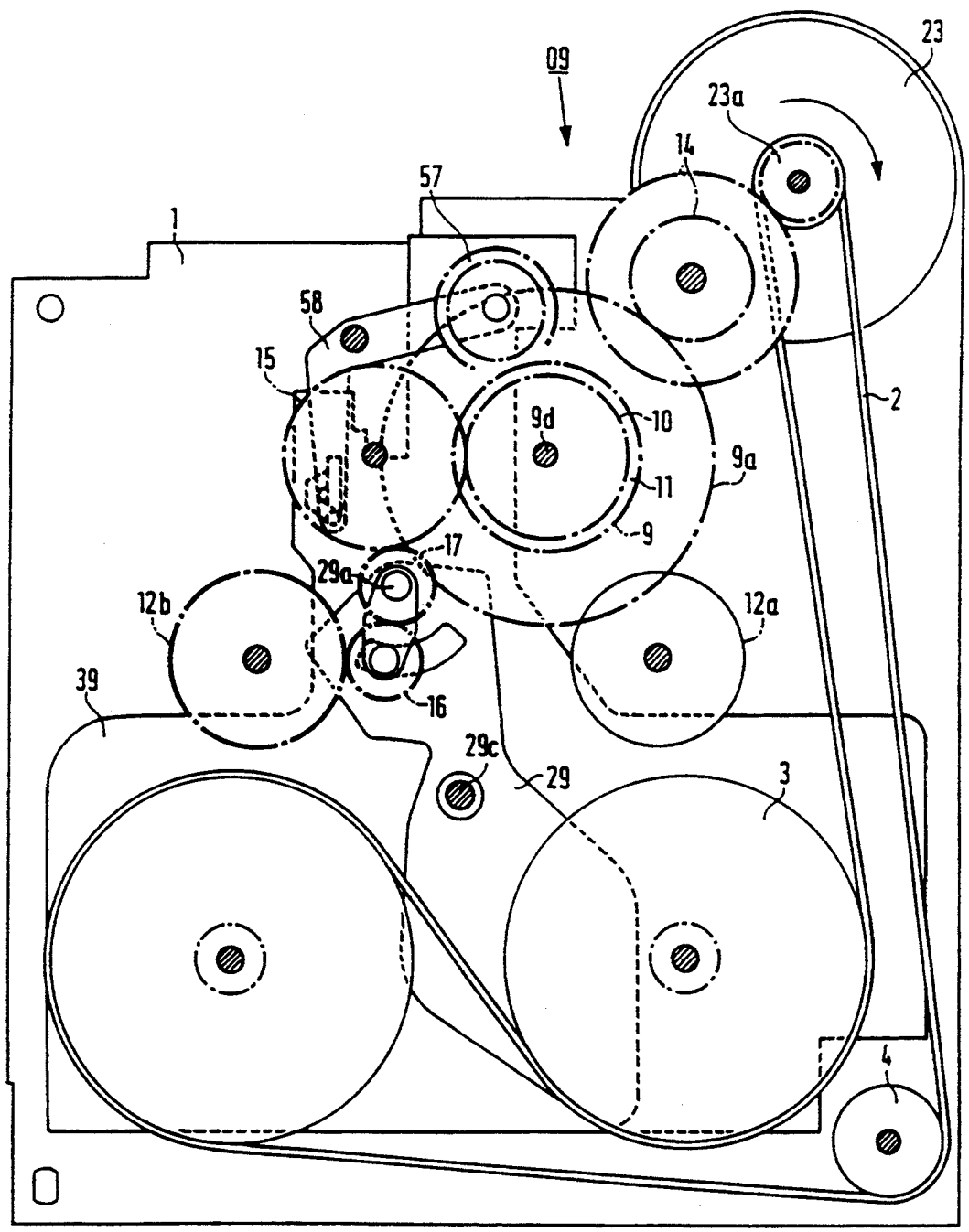
FIG. 3 is a diagrammatic representation of the deck shown in FIG. 1, set to the reverse play direction (REV)

The reel-drive mechanism 09 further comprises a reversing wheel 15, which is constantly in mesh with the secondary coupling wheel 10. In the case of reverse operation this reversing wheel, as is shown in FIG. 3, can drive the REV reel disc 12b via the intermediate wheel and the pivotal wheel 16. One arm of the two-arm bypass lever 58 carries the bypass wheel 57 and the other arm 58c of the bypass lever 58 carries an actuating pin 58a, which engages a guide profile 39a of the head support 39. This guide profile 39a is constructed as a continuous guide path comprising an upwardly inclined left-hand path section 39aa, which bends to the left in the drawing, and a rectilinear flat return path section 39ar, the ends of the path sections being interconnected. The actuating pin 58a can move around in the guide profile 39a. When the head support 39 moves from the play position into the eject position the actuating pin 58a will pass through the left-hand path section 39aa, causing the actuating pin 58a to be moved to the left and the bypass wheel 57 to be pivoted against the primary and the secondary coupling wheel 9 and 10. When the head support remains in this position the bypass wheel 57 provides a bypass connection between the primary and the secondary coupling wheel 9, 10. Since the transmission from the primary coupling wheel 9 to the secondary coupling wheel 10 via the bypass wheel has been selected in such a way that the secondary coupling wheel 10 can rotate with a higher speed this drive configuration enables a rapid rotation of the reel discs 12a, 12b to be achieved. This rapid rotation can be fast forward winding (FFW) or fast reverse winding (FRW) and will be described in more detail hereinafter.

Drive in the Reverse Play Direction (REV Play Mode)

Whereas FIG. 1 illustrates the play mode in the forward direction, FIG. 3 illustrates the play mode in the reverse (REV). FIG. 3 shows that the switching lever 29, which is pivotable about the pivot 29a, has been pivoted anti-clockwise. The switching mechanism 03 used for pivoting will be described in more detail hereinafter. In said position the intermediate wheel 17 is in mesh with the reversing wheel 15. Thus, the motor 23 drives the REV reel disc 12b in the REV direction via the motor shaft 23a, the intermediate drive wheel 14 and the toothed drive ring 9a of the primary coupling wheel 9, which rotates constantly clockwise in the same direction. The primary coupling wheel 9 drives the secondary coupling wheel 10 via the friction coupling 11. The secondary coupling wheel 10, in its turn, drives the reversing wheel 15, which rotates the REV reel disc 12b clockwise via the intermediate wheel 17 and the pivotal wheel 16.

In the present case of REV operation the meshing forces act on the individual toothed wheels in such a way that the pair REV reel disc 12b/pivotal wheel 16 is engaging and the pair REV wheel 15/intermediate wheel 17 is disengaging. The switching lever 29 is urged anti-clockwise by a switching-lever spring 66 (FIG. 4). The spring load is such that the switching lever 29 is pressed to the left against the meshing forces.

In the REV play mode as illustrated in FIG. 3 the bypass wheel 57 is disengaged from the primary coupling wheel 9 and the secondary coupling wheel 10, so that both coupling wheels are coupled to one another only via the coupling 11, i.e. with the possibility to slip.

Automatic Reversal (FIGS. 4a to 4e)

To proceed from the play direction in FIG. 1 to the other play direction in FIG. 3 the drive should be reversed. This reversing process is effected automatically in a play mode or in fast-winding mode at the end of the tape, when the tape transport stops. However, reversal is also possible by pressing a button. This will be described later under Manual reversal. Below the reversing process is described at the end of the tape when the tape transport is stopped in the forward mode (NOR); this is illustrated in FIGS. 4a to 4e.

Detection Mechanism for Reversal in the Play and the Fast-Winding Mode

The detection mechanism will be described with reference to FIG. 4a, which shows the switching lever 29 in the NOR play direction. FIG. 4a consequently relates to the detection of tape stoppage in the play mode. The secondary coupling wheel 10 then drives the NOR reel disc 12a via the intermediate wheel 17 and the pivotal wheel 16. A control lever 61 is pivotable about a pivot 61a. The control lever 61 comprises a sensing arm 61b, a switching arm 61c and a reversing arm 61d. The sensing arm 61b carries a sensing element 61f, which constantly slides on a radial surface of a reversing wheel 15 and thus exerts an anti-clockwise torque on the control lever 61. The switching arm 61c has a projection 61e, which is constantly pressed against an actuating profile 9b on the primary coupling wheel 9 as long as the reversing wheel 15 rotates. Owing to an eccentric position of the actuating profile 9b the control lever 61 then continually performs a pumping movement.

If the magnetic tape in the cassette has reached the end and stops, the NOR reel disc 12a and the secondary coupling wheel 10 coupled thereto also stop. The rotation of the primary coupling wheel 9 continues. The reversing wheel 15 is stopped because the secondary coupling wheel 10 has stopped. The primary coupling wheel 9, which still rotates, now pivots the control lever 61 with its switching arm 61c clockwise because the reversing wheel 15 no longer urges the sensing element 61f anti-clockwise. This is effected because no restoring torque is exerted on the control lever 61 since the reversing wheel 15 has stopped. The switching arm 61c of the control lever 61 now leaves the actuating profile 9b of the primary coupling wheel 9 and reaches a switching profile 9c. The switching arm 61c traverses the switching profile 9c and pivots the control lever 61 clockwise. As a result of this, the reversing arm 61d of the control lever 61 abuts against a projection 35e of a reversing lever 35 (FIG. 4a) and pivots this lever about its pivot 35d in the anti-clockwise direction indicated by an arrow 35f. This initiates the reversing process. Before the description of the reversing process is continued the construction of a switching mechanism 03 will be described.

Switching Mechanism 03

FIGS. 4a to 4e show the switching mechanism, which comprises two switching wheels 31a, 31b, one actuating spring 33, the reversing lever 35, which is pivotable about the pivot 35d, a starting lever 37, which is pivotable about a pivot 37c, as well as an actuating lever 65 and the switching lever 29 in the position for changing over from the NOR play mode to the REV play mode. A force F (direction indicated by an arrow 37f) produced by a switching-lever spring 30 (FIG. 4a) urges the starting lever 37 anti-clockwise. However, the starting lever 37 cannot be pivoted because a control nose 37b provided on this lever is latched by a latching recess 35bL of the control profile 35a of the reversing lever 35.

The reversing lever 35 is loaded by an over-centre spring, not shown. This over-centre spring operates as follows. When the reversal from the NOR mode to the REV mode is started the over-centre point is not passed. The reversing lever 35 therefore springs back in the clockwise direction. This applies both to a change from the NOR mode to the REV mode and to a change from the REV mode to the NOR mode. The situation in which the over-centre point of this over-centre spring is exceeded is fast reverse winding (FRW), for which purpose the reel-drive mechanism is reversed. When the fast reverse winding (FRW) button is pressed the over-centre point is exceeded and the reversing lever 36 is now urged anti-clockwise. As a result of the direction 37f of the force exerted on it by the switching-lever spring 30 the starting lever 37 tends to be pivoted out of its centre position in the anti-clockwise direction.

For a better understanding the construction and cooperation of the reversing lever 35 and the starting lever 37 will first be described with reference to FIG. 4e. The starting lever 37 has a control nose 37b, which cooperates with a control profile 35a of the reversing lever 35 in that it follows this control profile 35a. The control profile 35a has latching recesses 35bL and 35bR, which are oriented oppositely and open towards one another. The openings bear the references 35iL and 35iR. The latching recess 35bL for NOR operation has a latching edge 35Lb$_1$ and a facing latching edge 35Lb$_2$. In the drawing the opening 35iL of the latching recess 35bL branches into an upper left-hand guide path 35LO and a lower left-hand guide path 35LU. In the drawing the opening 35iR branches into an upper right-hand guide path 35RO and a lower right-hand guide path 35RU. The upper guide paths 35LO and 35RO are connected by an upper connecting path 35 VO. The lower guide paths 35LU and 35RU are connected by a lower connecting path 35VU. The connecting paths thus connect the left-hand half of the control profile 35a to the right-hand half of the control profile 35a. The connecting paths 35VO and 35VU have latching edges 35cO and 35cU, by which they are bounded outwardly. A first inclined run-on surface 35mL extends parallel to the upper guide path 35LO and rises from the low level of the bottom 35sO to the upper side of the upper left-hand latching edge 35Lb$_1$. A second inclined run-on surface 35mR extends parallel to the lower guide path 35RU and ends at the upper side of the lower right-hand latching edge 35Rb$_2$.

The control nose 37b can move through the guide paths and connecting paths in the anti-clockwise direction along a dash-dot line (-..-..-; 35y). However, at the left-hand side of the control profile 35a the control nose 37b can also move clockwise along a dashed curve (- - -; 35x) from the left-hand latching recess 35bL through the left-hand upper guide path 35LO and the upper left-hand inclined surface 35mL back into the latching recess 35bL.

Figure 4B:
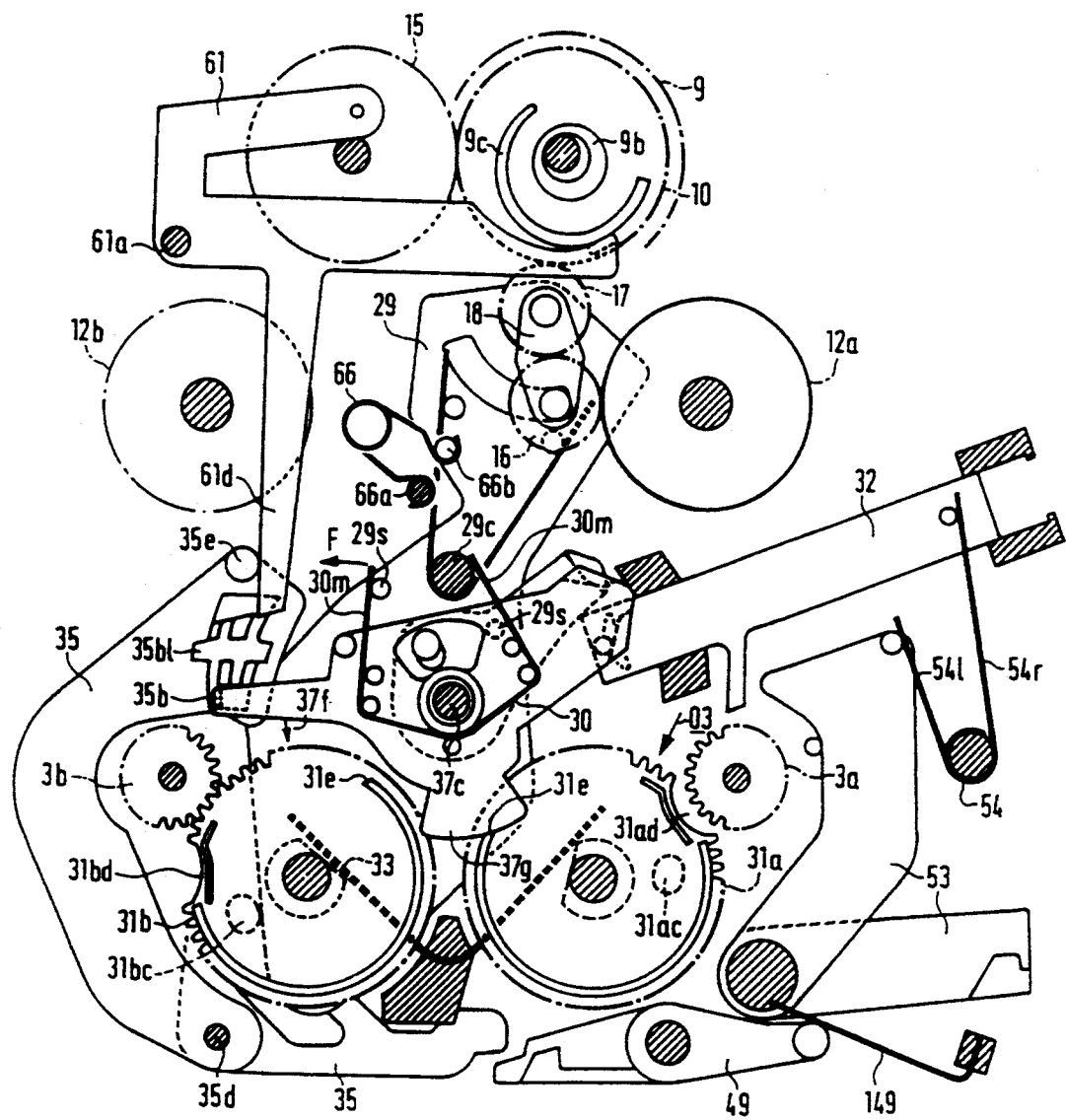
Figure 4C:
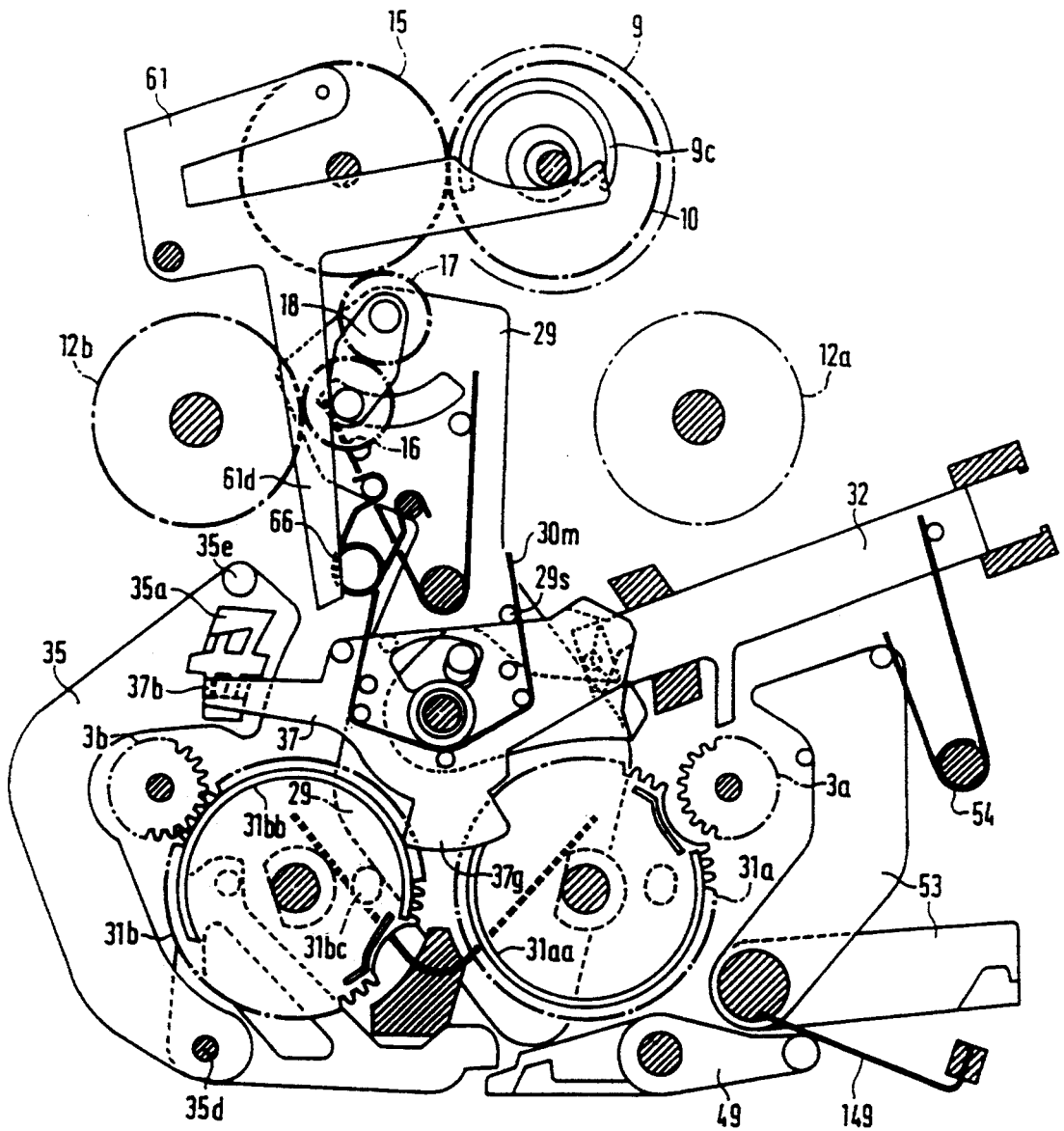
Figure 4D:
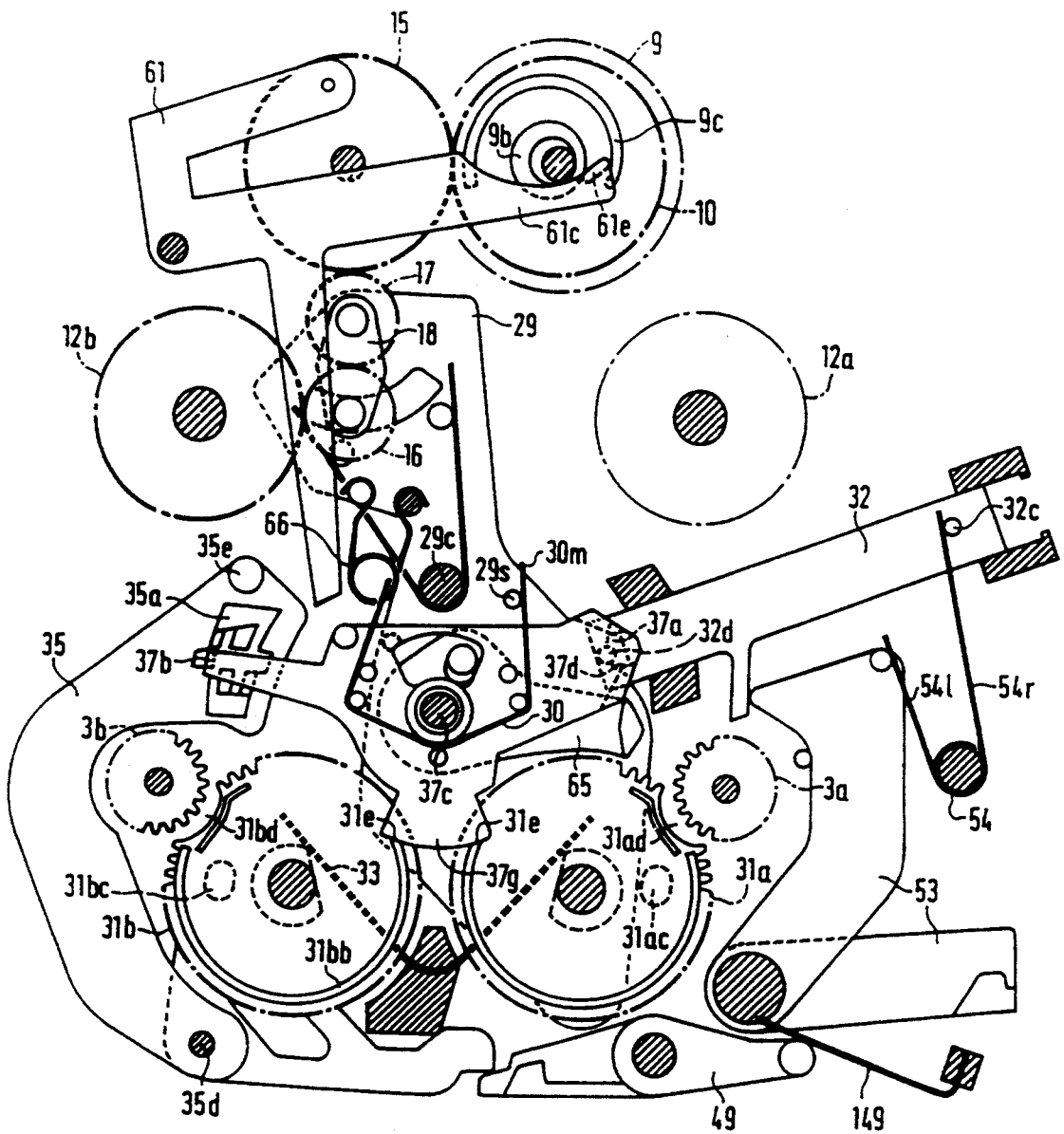
Figure 4E:
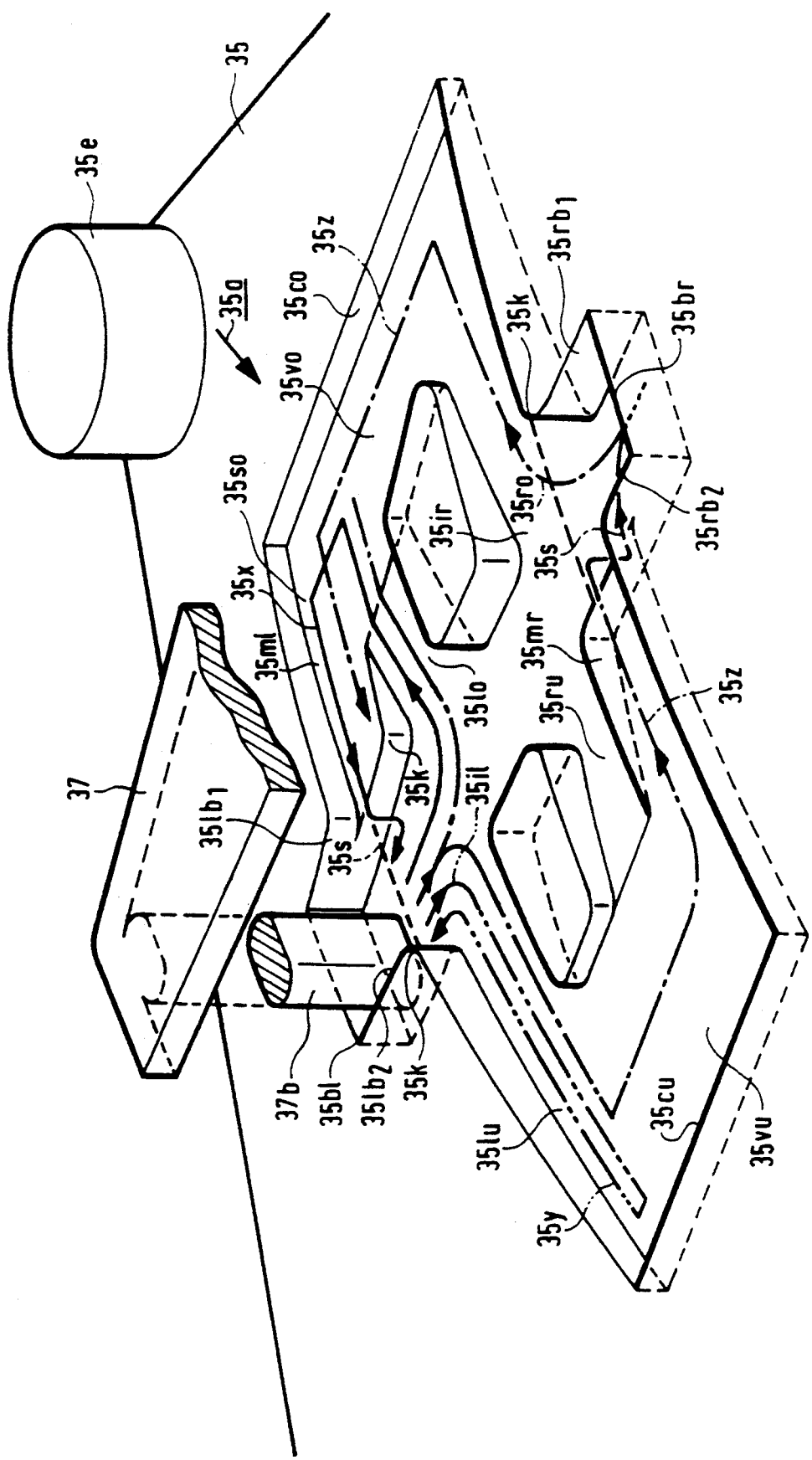
FIG. 4e shows a part of the mechanism shown in FIGS. 4a to 4d, to illustrate the cooperation of a reverse lever with a starting lever.

In the NOR play position the control nose 37b, as is shown in FIG. 4e, engages against a latching edge 35Lb$_2$. To switch the deck from the fast reverse winding mode to forward operation (FRW-NOR) the control nose 37b is disengaged from the right-hand latching recess 35bL and the latching edge 35Lb$_2$ in order to initiate the reversing process because either the reversing arm 61d or the button for fast reverse winding (51FRW) has urged the reversing lever 35 away in the anti-clockwise direction via the projection 35e. Since the starting lever 37 is spring-loaded in the anti-clockwise direction the control nose 37b travels in the guide path 35LU towards the lower connecting path 35VU and engages against the lower latching edge 35cU. In this position the starting lever 37 has moved so far anti-clockwise that a stop wall 37g has liberated a stop ridge 31bb in such a way that the actuating spring 33 can rotate the switching wheel 31b so far anti-clockwise that the flywheel teeth and the teeth of the switching wheel intermesh (see FIG. 4b). The consequences of this intermeshing will be described later. To return the levers 35, 37 into their initial positions, the reversing lever 37 being pivoted clockwise, the control nose 37b, as it follows the curve 35y, moves upward and engages behind the left-hand upper latching edge 35Lb$_1$. The starting lever 37 has then engaged in the left-hand latching recess 35bL.

In order to ensure that the control nose 37b does not overshoot into the guide path 35LO the left-hand upper latching edge 35Lb$_1$ has been extended so far up to a corner 35k that the returning control nose 37b will abut against the left-hand upper latching edge 35Lb$_1$.

This ensures that the path 35y is followed, in order to switch the switching mechanism from the NOR play mode to the REV mode.

In the REV play mode the starting lever 37 is urged clockwise by the switching lever 29. The control nose 37b consequently engages against the upper left latching edge 35Lb₂ in the latching recess 35bL. If for switching over from the REV mode to the NOR mode the reversing lever 35 is pivoted anti-clockwise to initiate the reversing process, the control nose 37b will leave the latching recess 35bL and will move upward along the curve 35x, shown in dashed lines, via the path 35Lo and engage against the latching edge 35co. In the course of the reversing process the direction of the force 37f exerted on the starting lever 37 by the starting-lever spring 30, as a result of which the control nose 37b pivots back into the central position via the inclined surface 35 ml and abuts against the edge 35Lb₂. During the reversal from REV to NOR the starting lever 37 is pivoted back in the clockwise direction, so that the control nose 37b of the starting lever returns into the latching recess 35bl.

If in the NOR play mode fast reverse winding (FRW) is desired the fast-winding button 51FRW is pressed, which causes the direction of the force acting on the reversing lever 35 to be reversed in an anti-clockwise direction in that the over-centre point is passed. As a result of this, the reversing lever 35 is pivoted anti-clockwise. The control nose 37b now traverses the dash-dotted (-.-.-.) path 35z in the anti-clockwise direction and stops at the lower right-hand latching edge 35Cu. Now the first reversing process during fast reverse winding is started. As a result of this, the force exerted on the starting lever by the spring 30 is reversed and the control nose 37b of this lever traverses the lower right-hand guide path 35mR along the path 35z in the clockwise direction, engages against the upper right-hand latching edge 35Rb₁ and subsequently engages the latching recess 35bR. The deck is now in the fast reverse winding mode.

If fast reverse winding is to be stopped the FRW push-button rod moves outward under the influence of a spring force which acts in the outward direction. The direction of the force exerted by the over-centre spring acting between the FRW button and the reversing lever 35 is then reversed and the reversing lever 35 is now spring-loaded in the clockwise direction. It pivots accordingly and the control nose 37b moves out of the latching recess 35bR and moves along the path 35z through the upper right-hand guide path 35Ro in the anti-clockwise direction up to the upper latching edge 35Co. Here, the second reversing process is initiated. As a result of the reversing process the force of the spring 30 on the starting lever 37 is reversed again and urges this lever in the anti-clockwise direction. The control nose 37b now follows the path 35z and moves through the upper left-hand guide path 35so in the anti-clockwise direction until it abuts against the latching edge 35Lb₂; finally, the control nose then slides back into the left-hand latching recess. Fast reverse winding (FRW) is now completed. The deck has thus been reset to the previously selected play direction by means of two reversals in total.

If starting from the REV play position fast reverse winding is desired, the control nose 37b of the starting lever 37 traverses the path 35z of the control profile 35a in a sense opposite to the directions as described above.

As described, each reversing process is started by moving away of the reversing lever 35, causing the control nose 37b to move out of the relevant latching recess 35bL/35bR, so that the starting lever is pivoted and the teeth of the switching wheel 31a or 31b mesh with the flywheel teeth 3a or 3b.

FIG. 4a shows the switching mechanism 03 used for switching over, which mechanism comprises the switching wheels 31a, 31b, the starting lever 37, the reversing lever 35, a reversal sensing element 49 and the capstan teeth 3a and 3b, in the NOR play position. The U-shaped starting-lever spring 30 is fitted around the pivot 37c of the starting lever 37. The switching lever 29 has pins 29s which can engage with one limb 30m of the starting-lever spring 30 depending on the starting-lever position. The relevant other limb 30m bears against the opposite pin 37m of the starting lever 37. The starting lever is then urged in the clockwise or anti-clockwise direction depending on the instantaneous play direction. A pivotal movement of the starting lever 37 is inhibited in that its control nose 37b is latched in the latching recess 35bL of the control profile 35a on the reversing lever 35. The two switching wheels 31a/b each have a toothless segment 31ad/bd. In the situation shown in FIG. 4a these toothless segments 31ad, 31bd are situated in the proximity of the flywheel teeth 3a/3b. Consequently, the flywheels can rotate freely. The actuating spring 33 loads the switching wheels in such a way that the left-hand switching wheel 31b is subjected to an anti-clockwise torque and the right-hand switching wheel to a clockwise torque. However, rotation is inhibited in that the ends 31e of the stop ridges 31aa/31bb provided on the switching wheels 31a/b engage against a stop edge 37g of the starting lever 37.

The stop ridges 31aa/31bb extend as arcs adjacent the toothed segments of the switching wheels 31a/b. The ends 31e of the stop ridges 31aa/31bb, which ends cooperate with the stop edge 37g, are arranged in a such a way that when these ends 31e engage against the stop edge 37g the toothless segments 31ad/31b of the switching wheels 31a, 31b face the flywheel teeth 3a, 3b. This ensures that the switching mechanism 03 is in the rest position during the play mode.

FIG. 4b illustrates the start of the reversing process. Since the reversing arm 61d is pivoted clockwise and abuts against the projection 35e of the reversing lever 35 the reversing lever 35 is pivoted in the anti-clockwise direction. As a result of this, the control nose 37b of the starting lever 37 is disengaged from the latching recess 35bL of the reversing lever 35. The starting lever 37 is consequently pivoted anti-clockwise under the influence of the force 37f.

FIG. 4c shows a further (subsequent) position of the switching mechanism 03. The starting lever 37 has been pivoted so far that its stop edge 37g leaves the stop ridge 31bb of the switching wheel 31b, so that this wheel is rotated anti-clockwise under the influence of the force of the actuating spring 33 and meshes with the flywheel teeth 3b. Subsequently, the switching wheel 31a is urged clockwise and lies against the stop edge 37g.

The process of switching over the reel-drive mechanism, which process is now started, is illustrated in FIG. 4c. The flywheel teeth 3b rotate the switching wheel 31b anti-clockwise, so that the actuating pin 31bc of this wheel abuts against the switching lever 29 and pivots this lever anti-clockwise. As a result of this, the pivotal mechanism comprising the pivotal lever 18, the pivotal wheel 16, and the intermediate wheel 17 is also switched from the NOR play position to the REV play position. FIG. 4d shows the situated after switching over has been completed.

During the switching movement of the reel-drive mechanism the right-hand pin 29s of the switching lever 29 abuts against the right-hand limb 30m of the starting-lever spring 30, which causes the starting lever 37 to be urged towards its centre position in order to move the control nose 37b thereof back into the latching recess 35bL of the reversing lever 35, which is spring-loaded towards its original position by processes to be described below. However, the pivotal movement of the starting lever 37 is blocked because its stop edge 37g abuts against the stop ridge 31bb. Unblocking is not effected until the actuating pin 31bc has pivoted the switching lever 29 into its end position. In said blocked position the switching wheel 31a cannot rotate any further because the stop ridge 31aa engages against the stop edge 37g. This ensures that the inactive switching wheel 31a cannot be started by inadvertent actuation while a switching process is in progress, because the switching lever 29 can be clamped between the two actuating pins 31bc/ac. After unblocking of the starting lever 37 this lever is pivoted further in the clockwise direction in agreement with the force exerted by the starting-lever spring 30 until the control nose 37b has engaged the left-hand latching recess 35bl.

The reversing process in the other direction proceeds similarly. However, to initiate the process the starting lever is pivoted clockwise and the switching wheel 31a is brought into mesh with the flywheel teeth 3a.

Fast Winding

In terms of driving fast forward transport in the forward mode (FFW-NOR) differs from normal forward transport in the forward mode (NOR) and fast forward transport in the reverse mode (FFW-REV) from the normal reverse transport (REV) only in that the primary coupling wheel 9 and the secondary coupling wheel 10 of the play coupling are coupled to one another via the two sets of teeth 57a and 57b of the bypass wheel 57. This is achieved in that during the movement of the head support 38 (FIG. 1) from the play position to the fast-winding position the pin 58i of the bypass-wheel lever 58 slides down the inclined surface 39aa of the guide profile 39a on the head support 39. Since the inclined surface 39aa has a curve to the left the actuating pin 58a of the bypass-wheel lever 58 pivots clockwise about the pivot 58b, so that the bypass wheel 57 meshes with the play coupling, i.e. the primary coupling wheel 9 with the secondary coupling wheel 10 have a bypass connection to one another. Since the coupling is bypassed the torque available at the reel of the NOR reel disc 12a is distinctly larger than during normal play. This means that the switching-lever spring 66, which pivots the switching lever 29, can be more powerful than necessary for the play mode, in which the meshing forces are limited by the play coupling. The force at which the teeth disengage can be distinctly larger than the force in the play mode. The maximum permissible force is limited by the torque at the primary coupling wheel 9. The large range permitted by the force ensures that the teeth are kept in mesh by the spring force in the play mode and the fast-winding mode but disengage at the end of the tape during fast winding, when the disengaging forces increase abruptly. This interplay of forces holds for both play directions.

Fast Forward Winding

During fast forward transport in the forward play mode (FFW-NOR) it is merely necessary to raise the driving speed of the reel disc 12a, whilst for the remainder the position of the mechanism is maintained. This is effected by applying the bypass wheel.

Fast Reverse Winding

When a button 51 FRW for fast reverse winding is pressed the reversing lever 35 is pivoted anti-clockwise, so that the starting lever 37 is released. At the same time the FRW fast winding button 51 pivots a latch 53 clockwise by means of a latching nose 51c, as a result of which a rectilinearly movable coupling slide 32 can move to the right under the influence of the force exerted by a leg spring 54. (There is always a force-sustained coupling between the latch 53 and the coupling slide 32 because the leg spring 54 acts between these two parts). As a result, the latching pin 32d engages between the stop edges 37d of the starting lever 37, so that the starting lever 37 can perform only a small pivotal movement and the reversing operation cannot yet be started. (Thus, the starting lever 37 cannot allow rotation of the switching wheels 31a, 31b). As the inward movement of the FRW fast-winding button 51 proceeds the latching nose 51c of this button releases the latch 53 again, so that this latch is pivoted back in the clockwise direction by spring force. The FRW fast-winding button 51 is latched behind the nose 53d of the latch 53 and cannot move back, while the coupling slide 32 is moved to the left by the latch 53 via the latching projection 32b. The pivotal movement of the starting lever is then no longer blocked, so that the starting lever 37 with its inclined walls 37s moves the coupling slide 32 further to the left via the latching pin 32d of this slide. As a result, a coupling nose 32a of this slide is moved so far to the left that during the subsequent reversing operation a release projection 65a of the actuating lever 65 does not move the coupling slide 32 to the right. Thus, the latch 53 is not pivoted and the FRW fast winding button just depressed remains locked in its depressed position.

Figure 5:
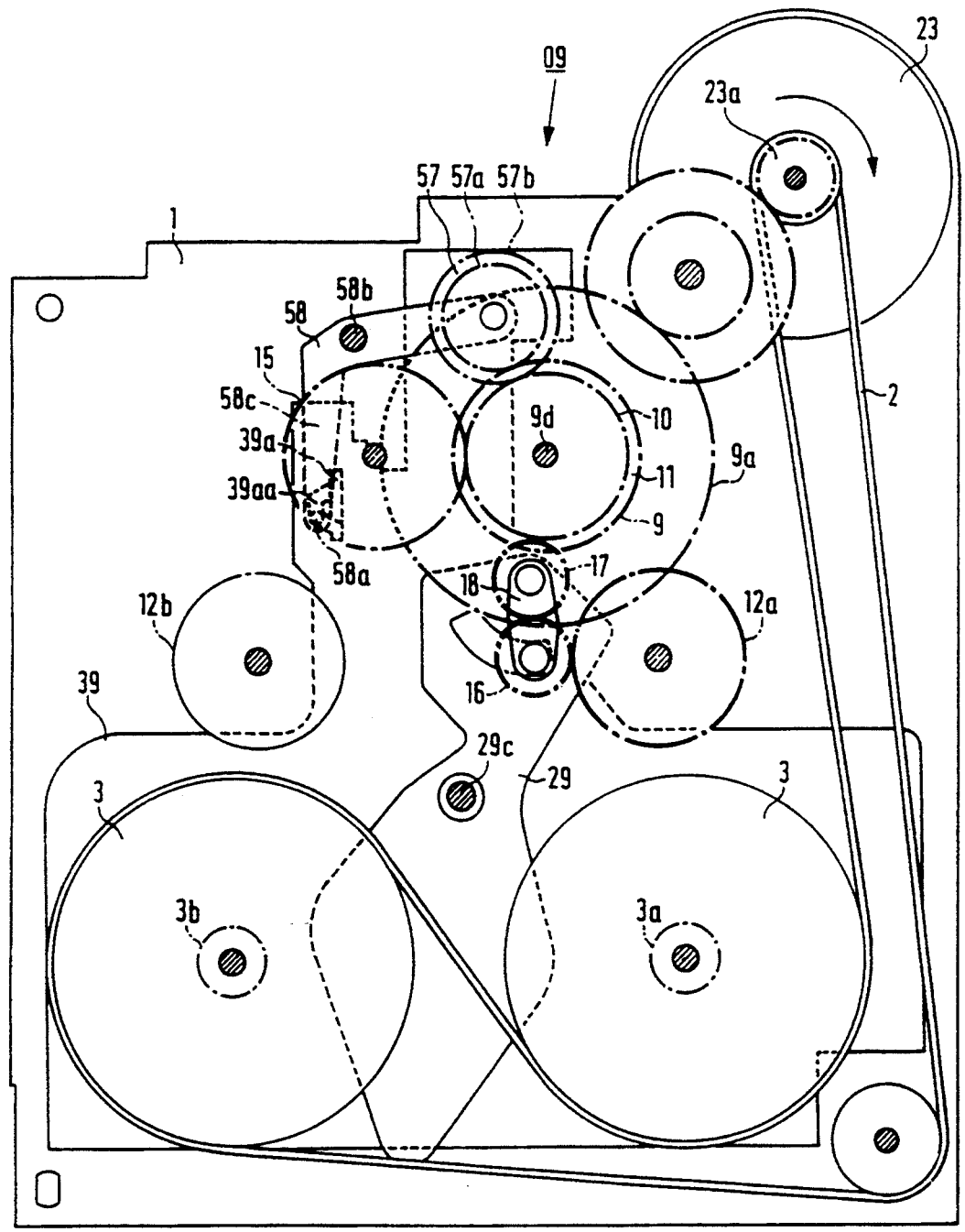
FIG. 5 shows the reel-drive mechanism in the switching position for fast forward winding in the forward play mode (FFW-NOR) and fast forward winding in the reverse play mode (FFW-REV)
Figure 6:
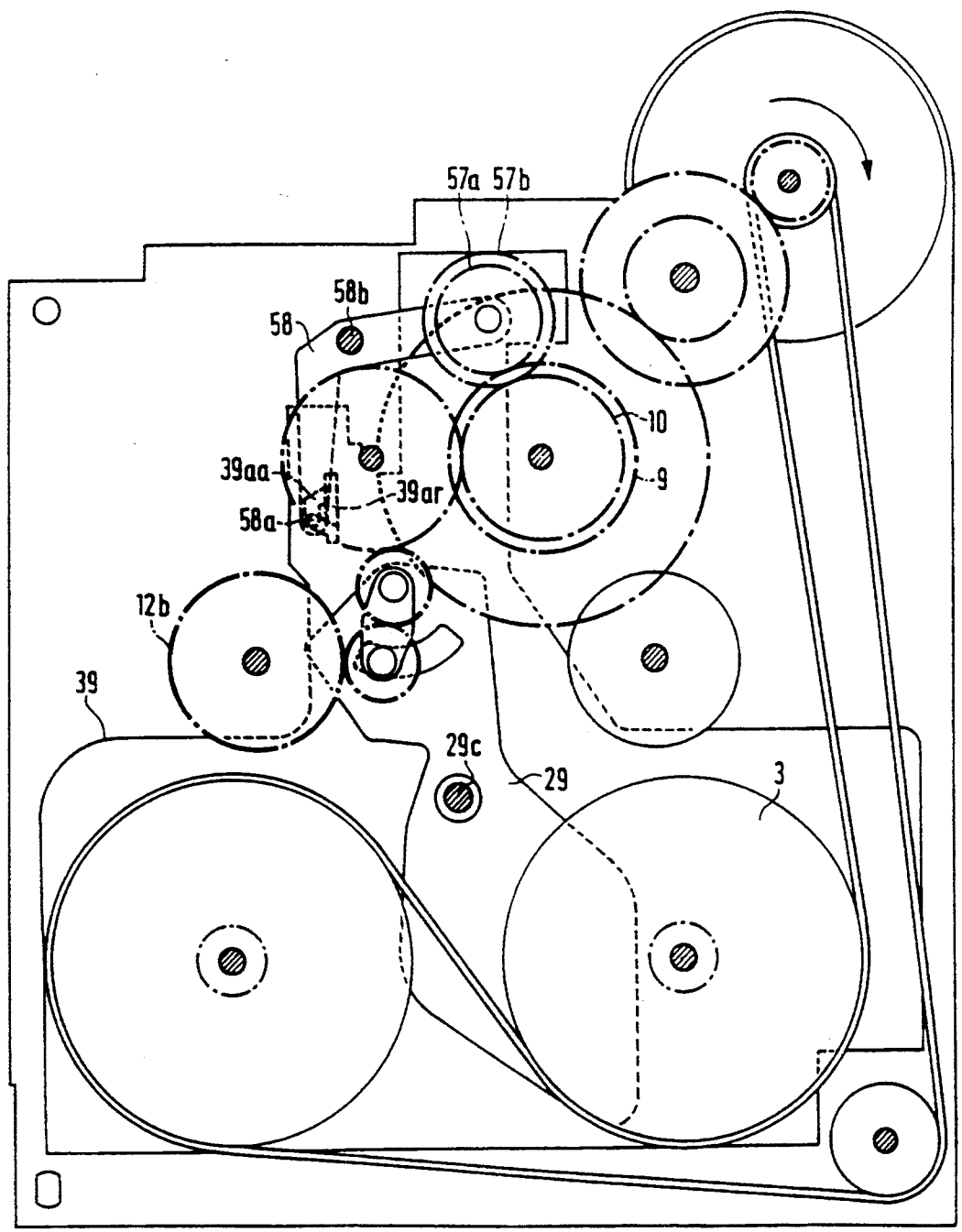
FIG. 6 shows the reel-drive mechanism in the switching position for fast forward winding in the reverse play mode (FFW-REV) and fast reverse winding in the forward play mode (FFW-NOR)

During the reversing operation via the starting lever 37, which is initiated as described above, the deck is changed over from the forward play direction shown in FIGS. 1 and 5 to the reverse play direction shown in FIGS. 2 and 6. During this changeover, as is shown in FIG. 2, the intermediate wheel 17 has meshed with the reversing wheel 15, and the pivotal lever 18 has applied the pivotal wheel 16 to the left-hand reel disc 17b. At the same time the head support 39 has moved from the play position to the fast-winding position, and the actuating pin 58a has applied the bypass wheel 57 to the primary and the secondary coupling wheels 9, 10 via the bypass-wheel lever 58. Consequently, the reel disc 12b is driven with a higher torque and a higher speed, the magnetic tape being rewound at high speed.

For fast reverse winding (FRW) in the forward play mode (NOR) the reel-drive mechanism 09 is switched to reverse transport. Usually this is effected by means of a special switching mechanism. However, such a special switching mechanism requires additional mounting volume and additional parts. Such an additional switching mechanism has now been dispensed with. This is possible in that for fast reverse winding the deck is reversed in the same way as for a change in play direction. Fast reverse winding can be stopped in two manners:
  A) by pressing a fast-winding button 52 FFW (the other non-depressed fast-winding button),
  b) automatically by winding until the end of the tape is reached.

In principle, when fast reverse winding is stopped the button 51 FRW for fast reverse winding moves outward and a 2nd reversal is effected, so that the same playing direction as before reverse winding is restored. The head support 39 immediately returns to the play position, so that playing can proceed in the forward (NOR) or reverse (REV) direction. Since fast reverse winding is always effected via a reversal FIGS. 5 and 6 show two operating positions in the fast winding mode. FIG. 5 shows fast forward winding in the forward play direction (FFW-NOR), which for the drive mechanism corresponds to fast reverse winding in the reverse play mode (FRW-REV). The command for fast forward winding is given by means of the fast forward button 52 FFW and the command for fast reverse winding is given by means of the fast reverse button 51 FRW.

FIG. 6 shows the position of the mechanism for fast forward transport in the reverse mode (FFW-REV) and the position of the mechanism for fast reverse transport in the forward play mode (FRW-NOR). Actuation is effected either via the fast forward button 52 FFW or the fast reverse button 51 FRW.

Manual Reversal

For manual reversal both fast-winding buttons 51FFW and 52FRW are depressed simultaneously up to a tangible stop, which is the lifting point of the head support. When both buttons are subsequently released the motor is switched on again and reversing begins. The process will be explained with reference to FIG. 7.

Figure 7:
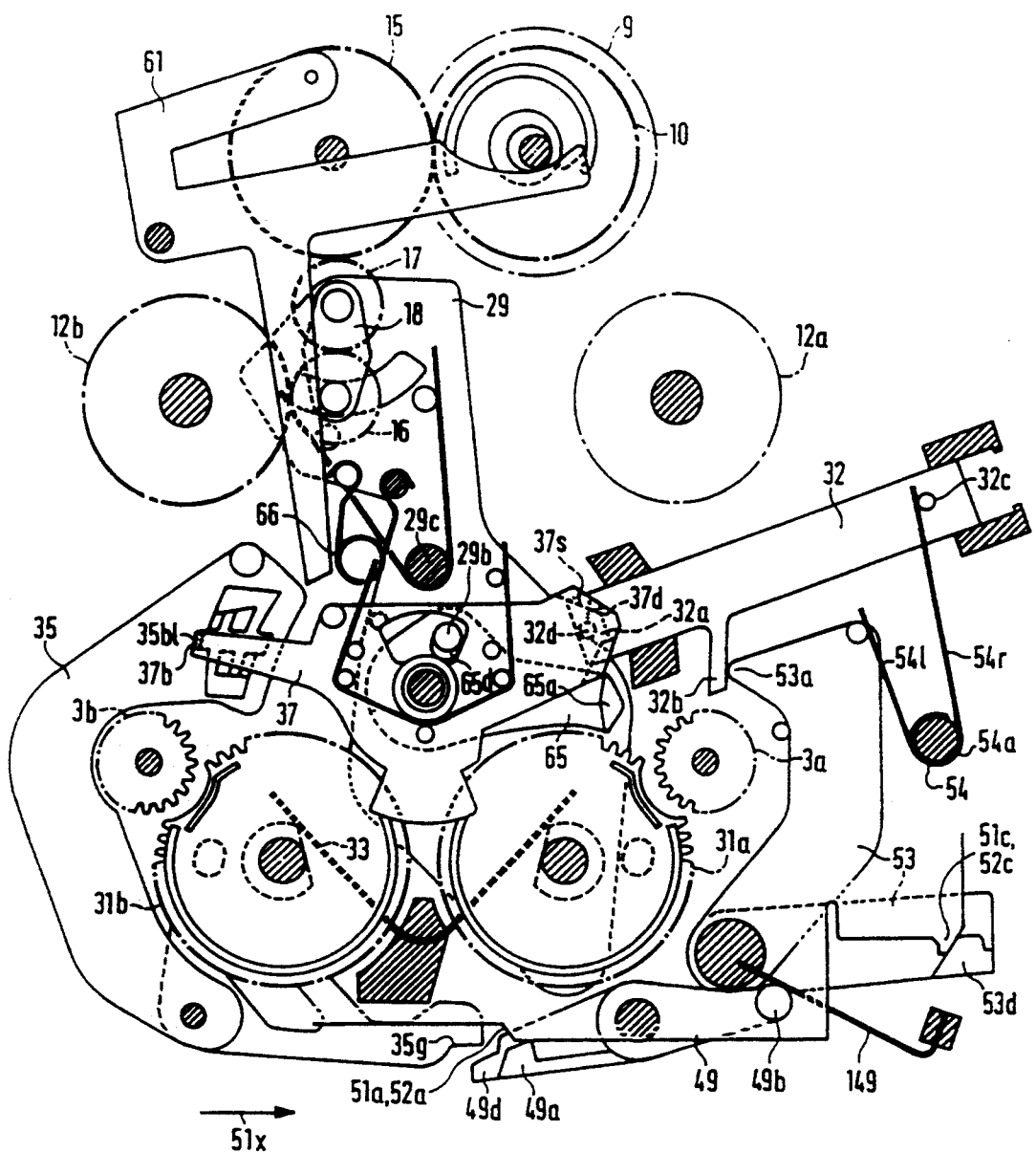
FIG. 7 shows the position of the mechanism in the reverse play mode.

FIG. 7 shows the reel-drive mechanism 09 without motor, the control lever 61, the switching lever 29, the reversing lever 35 with the starting lever 37, the flywheel teeth 3a and 3b, the switching wheels 31a, 31b with the actuating spring 33, and a reverse sensing element 49 in the reverse play position. The fast winding buttons 52FFW and 51FRW are shown only partly at the location of their actuating profiles 51a/52a and 51c/52c which cooperate with the reverse sensing element 49 and a latch 53.

Figure 8:
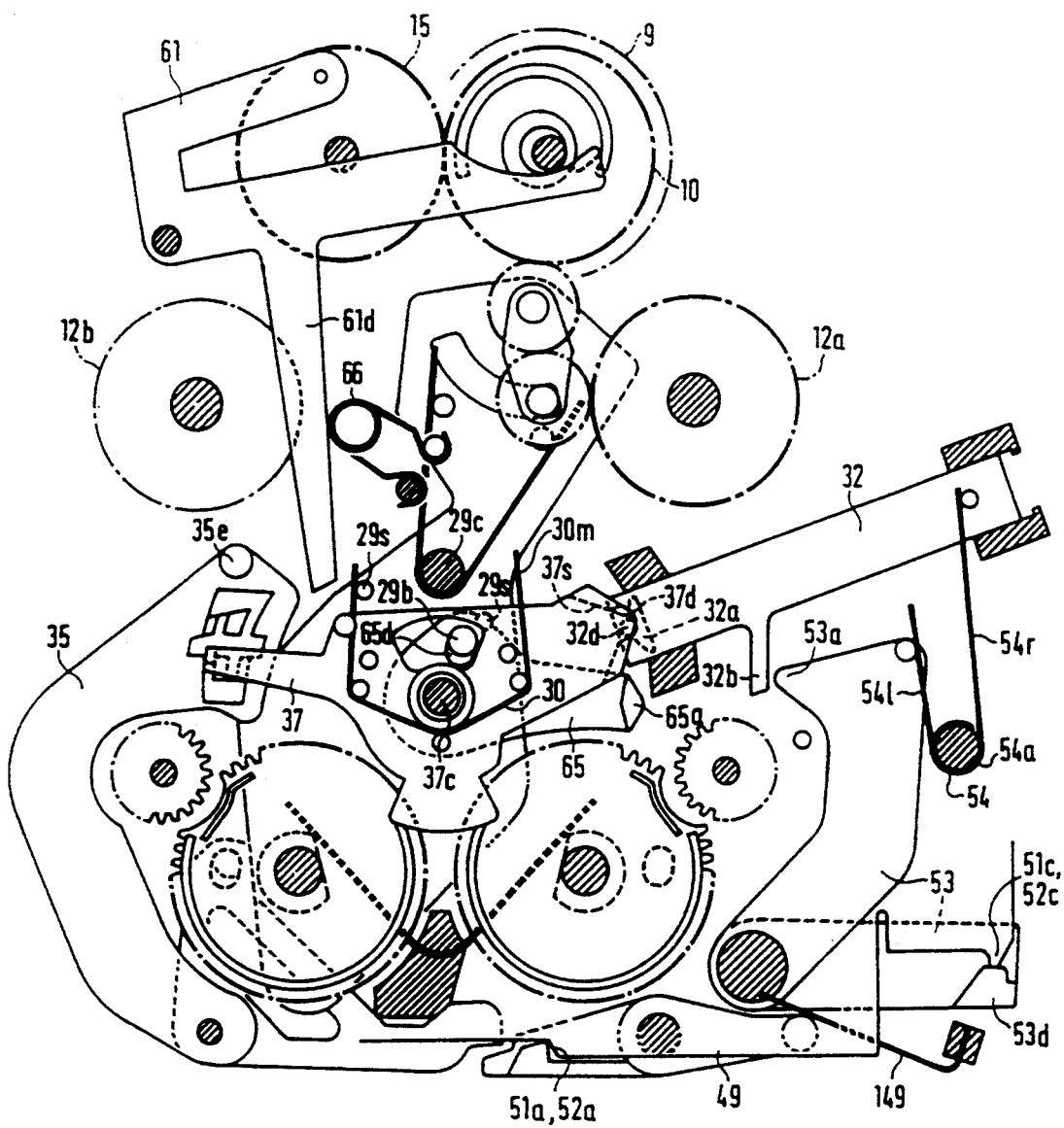
FIG. 8 illustrates the cooperation of the parts of the switching mechanism during the manual reversing process.

As a result of the simultaneous depression of both fast winding buttons a sensing pin 49a of the reverse sensing element 49 slides towards the actuating profiles 51a, 52a under the influence of the force of a spring 149, which acts upon a pin 49b, and is pivoted clockwise. A reversing projection 49d on the reverse sensing element 49 abuts against a sensing projection 35g of the reversing lever 35, so that this lever is pivoted anti-clockwise (FIG. 8). As a result of this, the starting lever 37 is released and its control nose 37b slides into the guide path 35LO after it has moved out of the latching recess 35bL; however, the starting lever 37 is not yet fully pivoted because the latch 53 is pivoted clockwise owing to the inward movement of the fast-winding buttons 51, 52 in the direction indicated by the arrow 51x, said latch being actuated at the latching pin 53d by means of pushbutton latching projections 51c/52c of the fast winding buttons 51/52. One leg 54L of the leg spring 54, whose coiled portion 54a is retained in the chassis 1, urges the latch 53 in the anti-clockwise direction. A second leg 54r of the spring 54 acts upon the actuating pin 32c of a coupling slide 32 and moves this slide with a latching projection 32b against a coupling projection 53a of the latch 53. The pivotal movement of the latch 53 causes the coupling slide 32, following the nose 53d, to be moved to the right, so that the latching pin 32d of the slide engages between the stop edges 37d of the starting lever 37, which edges act as guides, and thereby prevents a full pivotal movement of this lever (FIG. 8), so that the reversing operation cannot yet be started. However, the pivoting angle is adequate to allow the control nose 37b, after it has left the latching recess 35BL, to enter the guide path 35LO. When the two fast winding buttons 51, 52 are released the reversing projection 49d of the reverse sensing element 49 will be disengaged from the sensing projection 35g of the reversing lever 35 and the latch 53 will be released, so that the coupling slide 32 is moved to the left under the influence of the force of the spring 54 and unlatches the starting lever. The small pivotal movement of the starting lever 37 during the prior actuation of the fast winding buttons prevents the control nose 37b of the starting lever from engaging the latching recess 35bL; the starting lever 37 is now pivoted completely, the control nose 37b abutting against the upper edge 35co of the guide profile 35a. Now the motor is started. This initiates all the operations described in relation to the automatic reversal, starting with the release of the switching wheel 31b, upon which the teeth of the switching wheel 31b mesh with the flywheel teeth 3b and finally the switching lever is set from the NOR position to the REV position.

Reversal in the Case of End of Tape During Fast Winding

In order to prevent the belt from slipping at the end of the tape despite the absence of a fast-winding coupling the mechanism is constructed in such a way that when a limit force of the spring 66 is reached the disengaging-type drive mechanism pivots away from the relevant reel disc 12a, 12b, this pivotal movement being utilised to stop fast winding. The pin 29b of the switching lever 29, which is pivoted away, moves an actuating lever 65 via the slot 65d in this lever (the switching lever 29 and the actuating lever 65 being pivoted in opposite directions). A release projection 65a of the actuating lever 65 then abuts against the coupling projection 32a of the coupling slide 32. This slide is moved to the right and its latching projection 32b abuts against the coupling projection 53a of the latch 53, so that the actuated fast winding button 51 or 53 is released and moves outward. The head support 39, which has been moved into the eject position upon depression of one of the fast winding buttons, now moves forward into the play position. The bypass wheel 57 is pivoted out of engagement with the primary coupling wheel 9 and the secondary coupling wheel 10. Owing to the release of the coupling the meshing force having a disengaging action, which force was large as a result of the previously bypassed coupling and caused the teeth to be disengaged, decreases to the smaller value in the play mode. The restoring force exerted on the switching lever 29 by the spring 66 is now larger than the meshing forces with a disengaging action, so that the switching lever 29 is pivoted back into the play position. The deck is consequently in the play mode. Now an auto-reverse process is effected or the deck remains in the play mode, depending on whether previously fast forward or fast reverse winding had been selected.

The function performed by the coupling slide 32, i.e. the use of the pivotal movement of the switching lever 29 to release the fast-winding button at the end of the tape, which is not effected if before this a reversing operation has been started by a pivotal movement of the starting lever 37, ensures that upon depression of the FRW fast winding button 51 and during the subsequent reversing operation the button just depressed is not released at once. The pivotal movement of the switching lever 29 is transmitted to the latch 53 to release the fast-winding buttons only if the starting lever 37 has not been actuated. This construction solves a basic problem in mechanisms which do not employ an additional fast-winding drive system for fast reverse winding but for this purpose utilise the reversing mechanism, which is present anyway.

We claim:

1. A magnetic tape cassette apparatus, comprising:
   a) reel drive means including a pair of reel discs, said reel drive means being switchable from a first operating mode for driving a reel disc in a first tape transport direction and a second operating mode for driving the other reel disc in a second, opposite direction of rotation;
   b) a pair of toothed drive wheels;
   c) switching means for switching the reel drive means between the first and second operating modes, said switching means including a switching lever pivotable between the switching lever position in which the switching lever cooperates with one of said reel discs and a second switching lever position in which the switching lever cooperates with the other of said reel discs; and
   d) a pair of rotatable switching wheels each rotatable about an axis of rotation, said switching wheels each including (i) teeth which are engageable with and driven by the teeth of a respective toothed drive wheel and (ii) an actuating element protruding axially from the switching wheel which engages the switching lever upon rotation of the switching wheel for moving said switching lever from one switching lever position to the other switching lever position.

2. A magnetic tape cassette apparatus according to claim 1, wherein each of the switching wheels have toothless segments which are held within the range of the teeth of the respective drive wheel in the first and second operating modes so that the switching wheels are not rotated by the drive wheels during the first and second operating modes, and
   the apparatus further comprises first means for rotating a switching wheel until its teeth engage the teeth of the respective drive wheel so that the drive wheel rotates the switching wheel and biases the actuating element on said switching wheel against said switching lever for moving the switching lever from one position to the other position.

3. A magnetic-tape cassette apparatus as claimed in 2, further comprising a starting lever cooperable with said switching lever and having a stop edge, and wherein the switching wheels comprise stop ridges which cooperate with the stop edge of the starting lever in such a manner that the stop ridges are blocked by the stop edge so that said toothless segments face the drive wheel teeth in a corresponding operating mode, the starting lever being actuatable to selectively unblock the stop ridge of a switching wheel to allow rotation thereof.

4. A magnetic-tape-cassette apparatus as claimed in claim 3, further comprising a reversing lever which is moveable out of a latched position relative to the starting lever and which includes a control profile for selectively locking the starting lever against movement in the latched position of the reversing lever, the starting lever being movable within the control profile to allow it to be pivoted when the reversing lever has been moved out of its latched position.

5. A magnetic-tape-cassette apparatus as claimed in claim 4, wherein said apparatus further includes guide paths and a switching lever spring for biasing the switching lever and the starting lever, the starting lever is pivotably moveable between end positions and has a control nose guideable in the guide paths and, inside the control profile the reversing lever has first latching edges behind which the control nose of the starting lever is engageable in the switching end positions to block the starting lever, and the control nose is disengaged from the first latching edges when the control lever presses the reversing lever away from the relevant latching edge in such a manner that the control nose enters the guide paths allowing the starting lever, which is biased by the switching-lever spring, to be pivoted so as to liberate a switching wheel.

6. A magnetic-tape-cassette apparatus in claim 5, wherein the reversing lever includes further latching edges against which the control nose of the starting lever abuts and for limiting the pivotal movement of the starting lever the guide paths extend from the first latching edges to the further latching edges.

7. A magnetic-tape-cassette apparatus as claimed in claim 6, further comprising a reversing wheel having a radial surface and which is rotatable during rotation of the drive wheels and stationary when the drive wheels are stationary, and wherein the drive means includes a primary coupling wheel, having an eccentric actuating profile and a switching profile, and the control lever is pivotable about a pivot and comprises (i) a sensing arm having a sensing element which follows the radial surface of the reversing wheel and (ii) a switching arm having a projection which, during rotation of the reversing wheel and transport of the magnetic tape, follows the eccentric actuating profile of the primary coupling wheel with a pumping movement and which, when the reversing wheel is stationary because the tape transport has stopped, runs onto the switching profile which actuates the control lever in such a manner that the reversing arm of the control lever moves the reversing lever so as to disengage the control nose from the control profile of the reversing lever.

8. A magnetic tape cassette apparatus according to claim 2, wherein said switching wheel actuating elements are pins.

9. A magnetic tape cassette apparatus according to claim 2, wherein said first means comprises an actuating spring.

10. A magnetic tape cassette apparatus according to claim 2, further comprising an over-center spring, defining an over-center point of said switching lever, for alternately biasing said switching lever toward each of said first and second switching lever positions, and for moving said switching lever from one switching lever position to the other switching lever position, said actuating element of the switching wheel engaging the switching lever moves the switching lever past the over-center point, past which the over-center spring moves the switching lever toward the other switching lever position.

11. A magnetic tape apparatus according to claim 1, further comprising capstans for driving a tape of a magnetic tape cassette, and said drive wheels are flywheels on said capstans.

* * * * *